Figure 1:
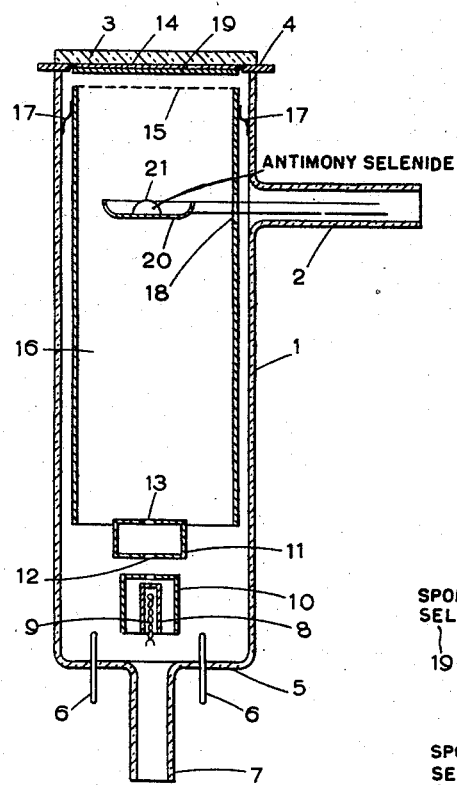

Oct. 27, 1959     H. G. LUBSZYNSKI ET AL     2,910,602
LIGHT SENSITIVE DEVICES
Filed July 22, 1957

INVENTORS
H. G. LUBSZYNSKI
E. F. G. MCGILL
S. TAYLOR

United States Patent Office 2,910,602
Patented Oct. 27, 1959

2,910,602
LIGHT SENSITIVE DEVICES

Hans Gerhard Lubszynski, Bruncketts, Waltham St. Lawrence, Eric Frederick George McGill, Twickenham, and Stanley Taylor, Sunbury-on-Thames, England, assignors to Electric & Musical Industries Limited, Middlesex, England, a British company Application July 22, 1957, Serial No. 673,332

Claims priority, application Great Britain July 24, 1956

18 Claims. (Cl. 313—65)

This invention relates to light sensitive devices having a light sensitive layer comprising photo-conductive material. One example of such a device is a pick-up tube such as is employed for television, the pick-up tube having a target electrode composed of a layer of photo-conductive material.

It has been proposed in a pick-up tube to employ a photo-conductive target electrode in which the photo-conductive material is antimony trisulphide. A target electrode composed of antimony trisulphide, however, has a maximum colour sensitivity at the violet end of the spectrum at a wavelength of about 4,600 A. A target electrode having a maximum colour sensitivity at the violet end of the spectrum is however in some cases undesirable.

The object of the present invention is to provide a light sensitive device employing a photo-conductive light sensitive layer in which when desired it is possible to obtain an increased sensitivity at the red end of the spectrum.

According to the invention a light sensitive device is provided comprising a light sensitive layer consisting of or including antimony selenide in spongy form.

The term "spongy" means that the antimony selenide is porous or has a sponge like structure. The antimony selenide may be provided in spongy form by evaporating it in a low gas pressure, the preferred gas being xenon. Antimony selenide is found to provide an increased sensitivity at the red end of the spectrum and in spongy form is found to have a less degree of photo-conductive lag and a higher resistivity compared with antimony selenide in solid form.

When employing antimony selenide solely to form the light sensitive layer of the device, it may be found that the overall sensitivity of the layer is low for a tolerable dark current and in order to increase the resistivity of the layer the layer may include antimony trisulphide. The amount of antimony trisulphide employed may range between 80 and 50%, the limit being set by high dark current with a high percentage of antimony selenide and lack of increased red response with a small percentage of antimony selenide. It is furthermore possible to employ in conjunction with the antimony selenide other photo-conductive materials such as selenium, cadmium sulphide and cadmium selenide. When antimony trisulphide or other photo-conductive material is employed in conjunction with antimony selenide the antimony trisulphide or other photo-conductive material may be mixed with the antimony selenide or alternatively the antimony selenide may be deposited as one layer and the antimony trisulphide or other photo-conductive material may be desposited on the antimony selenide as another layer. In cases where it is desired to take advantage of the increased red sensitivity of the antimony selenide it should be arranged that light projected onto the device should strike the antimony selenide first. If desired the light sensitive component may also be provided with a layer of photo-conductive material in solid form, the solid layer consisting of antimony selenide or antimony trisulphide or any other suitable photo-conductive material or mixtures thereof.

In order that the said invention may be clearly understood and readily carried into effect, it will now be more fully described with reference to the accompanying drawings as applied to a pick-up tube such as is employed for generating picture signals for television purposes. In the drawings Figure 1 is a longitudinal cross section of a typical pick-up tube embodying the invention and illustrating a method of depositing a photo-conductive layer Figures 2 to 5 illustrate on an enlarged scale various forms of layers embodying the invention, and Figure 6 illustrates normalised response curves of layers composed of antimony trisulphide and antimony selenide and a composite layer of antimony selenide and antimony trisulphide.

As shown in Figure 1 of the drawings the reference numeral 1 indicates a glass envelope having a side tube 2 and a window 3 which is sealed to the envelope 1 through the medium of a metal ring 4. On the other end of the envelope 1 there is provided a glass base 5 having metal contact members 6 hermetically sealed therethrough and arranged as a circular array around a pumping stem 7. Supported from the contact members 6 by means not shown is an electron gun comprising a thermionic cathode 8 with its associated heating element 9, an apertured control electrode 10 and an anode 11 having spaced apart apertures 12 and 13. The inner surface of the window after it is sealed to the envelope 1 through the medium of the ring 4 is provided with a suitable transparent electrically conducting coating 14 for example by spraying in known manner when the surface of the window is hot with a solution of a tin salt, the coating 14 being in electrical contact with the ring 4 so that it serves as a signal electrode from which picture signals can be derived. Adjacent to and facing the coating 14 there is provided a metal mesh electrode 15 carried by a metal cylinder 16 having spring fingers 17 which serve to locate the end of the cylinder 16 adjacent the window 3 whilst the opposite end of the cylinder 16 is supported from the gun structure in a manner not shown. The metal cylinder 16 is provided with an aperture 18 arranged to coincide with the side tube 2. The target of the pick-up tube shown in Figure 1 is a layer 19 of photo-conductive material. The general construction of pick-up tube shown in Figure 1 and the method of operating such a tube is well known in the art. When an optical image is projected through the window 3 elemental areas of the photo-conductive layer 19 assume different degrees of conductivity according to the intensity of elemental areas of the optical image and when the photo-conductive layer 19 is scanned by a low velocity electron beam from the electron gun positive charges set up on the surface of the layer 19 facing the electron gun depending on the incident light and the potential applied to the coating 14 are restored to a datum potential so generating picture signals across an impedance connected to the coating 14.

In accordance with the present invention the target of the pick-up tube consists of or includes photo-conductive antimony selenide in spongy form. The target electrode may thus consist of a layer of antimony selenide or may be a mixture of antimony selenide with another or other photo-conductive materials or may be composed of several separate layers as hereinafter referred to.

In order to form the spongy layer the material to form the layer is evaporated onto the transparent coating 14 from a boat 20 containing a quantity of antimony selenide. The boat 20 may be made of ceramic material and provided with a tantalum heater and can be moved magnetically in known manner from within the side tube 2 to the position shown, the envelope 1 is subjected to the coating 14. Prior to the disposition of the boat 20 in the position shown, the envelope 1 is subjected to the usual baking and degassing operations at a temperature of for example 300–350° C., the envelope being continuously evacuated through the stem 7. After the baking and degassing operation the boat 20 and the antimony selenide is then moved to the position shown in Figure 1 and a suitable gas such as xenon, argon, nitrogen or air at a suitable pressure is admitted to the envelope. The optimum gas pressure will depend on the particular gas used and with xenon a pressure of 0.4 mm. of mercury is suitable. The gas pressure should not, however, be less than 0.3 mm. of mercury although higher gas pressures may be employed say up to 0.9 mm. of mercury. A heating current is then applied to the heater in the boat 20 so as to cause evaporation of the antimony selenide. Due to the presence of the gas the antimony selenide becomes deposited on the conducting coating 14 in spongy form. The antimony selenide passes through the mesh 15 and if during the evaporation process the mesh becomes clogged with the evaporated material then the mesh can be cleared of such material by heating the mesh by eddy current heating. The layer 19 is shown in enlarged view in Figure 2.

The use of antimony selenide in spongy form is found to produce a photo-conductive layer which has an increased sensitivity at the red end of the spectrum compared with a photo-conductive layer formed of antimony trisulphide as shown in Figure 6.

In order to increase the resistivity of a pure antimony selenide layer and to provide a more uniform spectral response it is preferred to employ such material in conjunction with antimony trisulphide and a typical layer for this purpose may be composed of 22% of antimony selenide and 78% of antimony trisulphide. A layer composed of these two materials may be formed by evaporating a mixture of the materials simultaneously from a single source such as the boat 20 shown in the drawing or alternatively separate sources of the materials may be employed. Where it is desired to retain the increased sensitivity of a layer it should be ensured that antimony trisulphide should not be first deposited on the conducting coating 14, that is to say light projected through the window 3 should impinge on some antimony selenide. In this case it is preferred to employ separate sources in different boats for the two materials to be evaporated to form the layer 19 so as to ensure that antimony selenide is first deposited. Where a mixture of the materials is used or separate sources of material in a single boat, then if the boat is heated rapidly antimony selenide will be deposited substantially simultaneously with the antimony trisulphide. As shown in Figure 6 a layer composed of antimony selenide and antimony trisulphide in the proportions referred to has its spectral sensitivity peak shifted well towards the red end of the spectrum compared with that of antimony trisulphide. It was found that when the target electrode was exposed to an object illuminated by 100 watt tungsten lamps giving approximately 20 ft. candles of visible light at the target and when this light was filtered using an Ilford Filter No. 207 which filtered out all wavelengths shorter than 7,200 A, 25% of the generated signal was left compared with the signal obtained when no filtering was employed.

Figure 3:
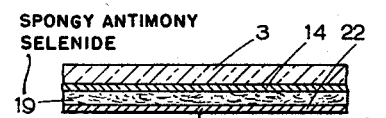

If desired as shown in Figure 3 of the drawings a solid layer 22 of antimony selenide, antimony trisulphide or some other photo-conductive material may be deposited on the surface of the layer 19 remote from the conducting coating 14. The layer 19 may, of course, consist solely of antimony selenide or a mixture of antimony selenide and antimony trisulphide or some other photo-conductive material. The solid layer 22 may be formed by evaporating photo-conductive material which has become deposited on the inner wall of the metal cylinder 16 and on the mesh 15 during the formation of the spongy layer by evacuating the envelope 1 to a high degree of vacuum such as $10^{-4}$ or mercury or better.

Figure 4:
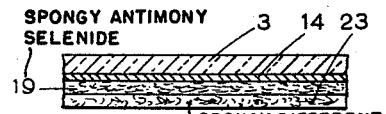

Figure 4 illustrates an alternative form of the invention in which two separate layers 19 and 23 of photo-conductive material in spongy form are superimposed on one another on the conducting coating 14. The layer 19 may be composed as described above whilst the layer 23 may be composed of antimony trisulphide or another photo-conductive material or a mixture of such materials. Where the increase of red sensitivity is not required the order of the layers 19 and 23 may be reversed. The layer 23 described with reference to Figure 4 may if desired be provided with a solid layer of photo-conductive material 22 as described with reference to Figure 3.

Figure 2:
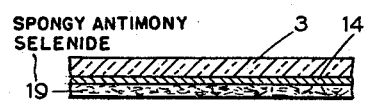
Figure 5:
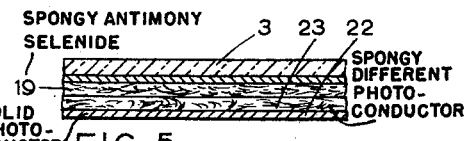
Figure 6:
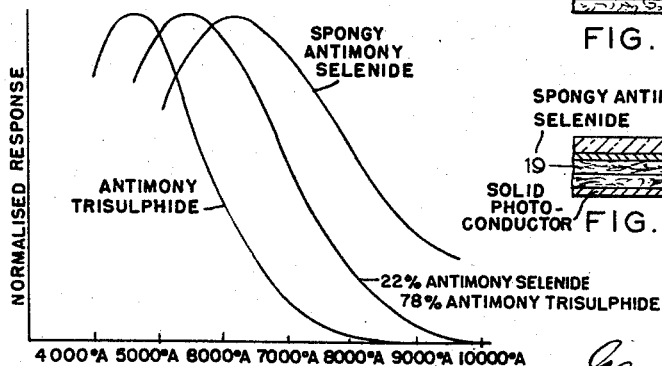

The overall thickness of the layer 19 of Figure 2 or of the composite layers shown in Figures 3, 4 and 5 for a pick-up tube as shown in Figure 1 is about five microns. Where a solid layer 22 is provided this solid layer is preferably from 0.5 to 1 micron in thickness and where two spongy layers are employed as shown in Figures 4 and 5 these layers should each be of about 2 microns thick. The respective thicknesses are not critical and may differ from each other although the resultant composite layer should be about 5 microns thick. In order to provide a spongy layer of the thickness above mentioned for a layer comprising a mixture of antimony selenide and antimony trisulphide two separate evaporators containing respectively 4 milligrams of antimony selenide and 8 milligrams of antimony trisulphide may be employed. A single evaporator may be employed with separate amounts of said materials or a mixture thereof. Where two separate spongy layers are required two evaporators will be employed provided respectively with 8 milligrams each of antimony selenide and antimony trisulphide. The quantities of materials above referred to are sufficient to provide a layer of approximately 5 microns thick where the relevant dimensions of the device shown in Figure 1 are as follows:

The cylinder 16 has a circular end opening of 20 mms. in diameter, the mesh 15 has a pitch of 600 meshes per linear inch with about 60% transparency. The mesh has a diameter of 20 mm. and is disposed from the conducting coating 14 by a distance of 3 mm. The actual thickness of the deposited material may vary due to the amount of material collected by the cylinder 16 and mesh 15 and not subsequently re-evaporated but in the examples of weights given above the whole of the material is evaporated from the boat or boats.

What we claim is:

1. A light sensitive device having a light sensitive layer comprising at least in part photo-conductive antimony selenide in spongy form.

2. A light sensitive device having a light sensitive layer comprising photo-conductive antimony selenide and further photo-conductive material to increase the resistivity of said layer.

3. A light sensitive device having a light sensitive layer comprising photo-conductive antimony selenide in spongy form and further photo-conductive material to increase the resistivity of said layer.

4. A light sensitive device having a light sensitive layer comprising photo-conductive antimony selenide and antimony trisulphide to increase the resistivity of said layer.

5. A light sensitive device having a light sensitive spongy layer comprising photo-conductive antimony selenide and antimony trisulphide to increase the resistivity of said layer.

6. A light sensitive device according to claim 5 wherein the proportion of antimony trisulphide is between 50 and 80%.

7. A light sensitive device according to claim 5 wherein said layer comprises about 22% antimony selenide and about 78% of antimony trisulphide.

8. A light sensitive device having a light sensitive layer composed of photo-conductive antimony selenide and a further layer of a different photo-conductive material on said first-mentioned layer.

9. A light sensitive device having a light sensitive layer comprising photo-conductive antimony selenide in spongy form and a further layer of antimony trisulphide in spongy form formed on said first-mentioned layer.

10. A light sensitive device comprising an envelope having a light admitting portion, a light sensitive layer comprising photo-conductive antimony selenide and further photo-conductive material to increase the resistivity of said layer, said photo-conductive antimony selenide being disposed adjacent to said light admitting portion so that light first impinges on said antimony selenide.

11. A light sensitive device comprising an envelope having a light admitting portion, a light sensitive layer comprising photo-conductive antimony selenide in spongy form and a solid layer of photo-conductive material on said spongy layer, said spongy layer being disposed adjacent to said light admitting portion so that light passing through said portion first impinges on said antimony selenide.

12. A light sensitive device comprising an envelope having a light admitting portion, a substantially transparent conducting member, a light sensitive layer on said conducting member comprising at least one spongy layer composed at least in part of photo-conductive antimony selenide and a further layer of photo-conductive material in solid form to increase the resistivity of the composite layer so formed, said light admitting portion admitting light through said transparent conducting member to said spongy layer.

13. A pick-up tube having a target electrode comprising a substantially transparent conducting member and a light sensitive layer thereon composed at least in part of photo-conductive antimony selenide in spongy form.

14. A pick-up tube having a window and a target electrode comprising a substantially transparent conducting member, a spongy layer composed at least in part of photo-conductive antimony selenide on said transparent conducting member and a solid layer of photo-conductive material disposed on the surface of said spongy layer remote from said transparent conducting member.

15. A pick-up tube according to claim 14, wherein said spongy layer includes further photo-conductive material to increase the resistivity of said layer.

16. A pick-up tube according to claim 14, wherein said spongy layer includes antimony trisulphide.

17. A pick-up tube according to claim 14, wherein the spongy layer includes antimony trisulphide in a proportion of between 50 and 80%.

18. A pick-up tube according to claim 14, wherein said layer includes about 22% antimony selenide and about 78% of antimony trisulphide.

References Cited in the file of this patent
UNITED STATES PATENTS

| | | |
|---|---|---|
| 2,687,484 | Weimer | Aug. 24, 1954 |
| 2,710,813 | Forgue | June 14, 1955 |
| 2,744,837 | Forgue | May 8, 1956 |